United States Patent [19]

Kanai

[11] Patent Number: 4,654,749
[45] Date of Patent: Mar. 31, 1987

[54] HIGH-VOLTAGE CERAMIC CAPACITOR AND METHOD OF PRODUCING THE SAME

[75] Inventor: Kazuhiko Kanai, Kyoto, Japan

[73] Assignee: Murata Manufacturing Co., Ltd., Japan

[21] Appl. No.: 760,633

[22] Filed: Jul. 30, 1985

[51] Int. Cl.⁴ .................. H01G 4/10; H01G 4/38; H01G 7/00

[52] U.S. Cl. .................. 361/321; 29/25.42; 361/328

[58] Field of Search ............. 29/25.42; 361/321, 328, 361/320

[56] References Cited

U.S. PATENT DOCUMENTS

| | | | |
|---|---|---|---|
| 2,552,653 | 5/1951 | Stupakoff | 361/321 |
| 2,952,805 | 9/1960 | Dornfeld | 361/321 X |
| 3,426,257 | 2/1969 | Youngquist | 29/25.42 X |
| 3,586,934 | 6/1971 | Nakata | 29/25.42 X |
| 3,745,431 | 7/1973 | Imamura et al. | 361/321 |

*Primary Examiner*—Donald A. Griffin
*Attorney, Agent, or Firm*—Ostrolenk, Faber, Gerb & Soffen

[57] ABSTRACT

A high-voltage ceramic capacitor comprising outer electrodes having the same external diameter as that of a ceramic dielectric element, the outer electrodes being formed on opposite surfaces of the ceramic dielectric element, the ceramic dielectric element having at least one intermediate electrode having the same diameter as that of the ceramic dielectric element; and ceramic dielectric plates having the same external diameter as that of the ceramic dielectric element and throughholes in the center thereof for leading out the electrodes, the ceramic dielectric plates being formed on both surfaces of the ceramic dielectric element through the electrodes and sintered to form one body together with the ceramic dielectric element.

13 Claims, 11 Drawing Figures

HIGH-VOLTAGE CERAMIC CAPACITOR AND METHOD OF PRODUCING THE SAME

BACKGROUND OF THE INVENTION

This invention relates to a high-voltage ceramic capacitor with improved rupture strength per unit of thickness and compact construction and the method of producing the same.

The recent trend is for electronic products to be made more compact, that is, lighter, thinner, shorter and smaller. It is attended with an increasing demand for smaller capacitors, resistors and the like. In order to meet such a demand, there are being introduced smaller capacitors except high-voltage ones and technically the latter has been left behind in the march of progress.

The capacitance of a capacitor is expressed by $$C = \epsilon_0 \epsilon S / t$$

where $\epsilon_0$ = vacuum dielectric constant; $\epsilon$ = specific dielectric constant; S = area of electrode; and t = space between electrodes.

In the above equation, t is designed in consideration of the voltage applied to the capacitor and the rupture strength per unit of thickness thereof. In the high-voltage capacitor, t is increased to raise the rupture strength, whereas S is increased to obtain desired capacitance, whereby the capacitor becomes large-sized. Consequently, rupture strength per unit of the thickness of a dielectric element must be increased to reduce the size of the high-voltage capacitor. But such is the present state that no significant technical know-how has been ascertained.

FIG. 1 illustrates the construction of a conventional high-voltage ceramic capacitor. In FIG. 1, there is shown a high-voltage ceramic capacitor 1 comprising a ceramic dielectric element 2, electrodes 3, 4, leads 5, 6 connected to the electrodes 3, 4 and a coating 7 prepared from high-insulation synthetic resin such as epoxy resin.

The withstand voltage characteristics of a capacitor of this type are affected by the difference between the external diameter of the ceramic dielectric element 2 and those of the electrodes 3, 4 when the capacitor is designed. When the external diameters of the dielectric and the electrodes are the same, the withstand voltage is maximized, whereas the greater the difference, the lower the withstand voltage becomes.

Any defect within the ceramic dielectric element is also known to be a decisive factor affecting the withstand voltage characteristics. Why the interior defect affects the withstand voltage characteristics will be given as follows:

The known method of preparing the ceramic dielectric element 2 comprises, for instance, adding a binder and water to a dielectric material mainly composed of barium titanate, drying as well as atomizing the mixture using a spray-dryer to make powder, compacting the powder, and firing the mold in an electric furnace to obtain a sintered ceramic dielectric element.

However, because there are produced many pinholes 8 in the mold thus prepared by compacting and pinholes are not completely removed by baking, some of them still remain in the sintered ceramic dielectric element 2. Particularly when the pinholes 8 continuously exist along the direction between the electrodes 3, 4, the disadvantage is that the application of voltage across the electrodes 3, 4 will cause breakdown at a relatively low voltage. Thus the high-voltage capacitor is not available for the above reasons.

SUMMARY OF THE INVENTION

In view of the foregoing, it is an object of the present invention to provide a high-voltage ceramic capacitor with the relieved concentration of electric charges at the ends of electrodes, less pinholes in its ceramic dielectric element and excellent withstand voltage characteristics and a method for producing the same.

The high-voltage capacitor of the present invention comprises electrodes having the same outer diameter as that of a ceramic dielectric element, the electrodes being formed on both surfaces of the ceramic dielectric element having at least one intermediate electrodes having the same diameter as that of the ceramic dielectric element, and ceramic dielectric plates having the same outer diameter as that of the ceramic dielectric element and throughholes in the center thereof for leading out the electrodes, the ceramic dielectric plates being formed on both surfaces of the ceramic dielectric element through the electrodes and sintered to form one body together with the ceramic dielectric element.

BRIEF DESCRIPTION OF THE DRAWINGS

FIGS. 3(a)–3(c) illustrate the procedure for producing the high-voltage ceramic capacitor embodying the present invention, wherein FIG. 3(a) is a perspective view of dielectric ceramic green sheets before being laminated, FIG. 3(b) is an exploded cross sectional view illustrating the procedure comprising steps of printing and applying electrode paste corresponding to an intermediate electrode to the dielectric ceramic green sheets constituting a laminated body, and piling dielectric ceramic green sheets on both surfaces of the laminated body, and FIG. 3(c) is a vertical cross sectional view of a sintered body made into one body by sintering.

DETAILED DESCRIPTION OF EMBODIMENTS OF THE INVENTION

Figure 1:
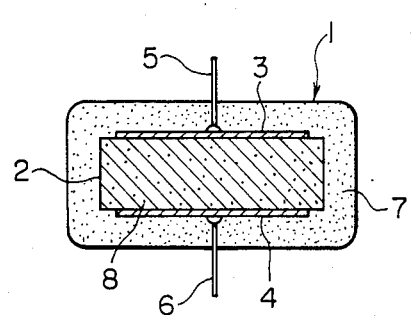
FIG. 1 is a vertical cross sectional view of a conventional high-voltage ceramic capacitor.

Referring now to the drawings, embodiments of the present invention will be described in detail.

Figure 2:
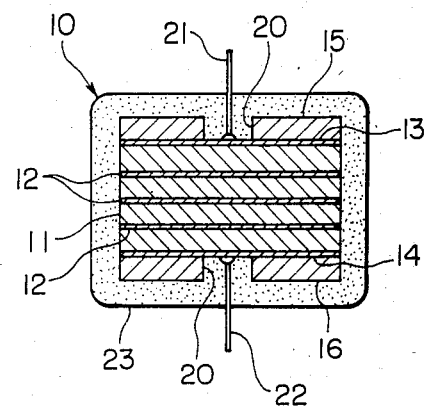
FIG. 2 is a vertical cross sectional view of a high-voltage ceramic capacitor embodying the present invention.

FIG. 2 is a vertical cross sectional view of a high-voltage ceramic capacitor embodying the present invention. In FIG. 2, there is shown a high-voltage ceramic capacitor 10 comprising a ceramic dielectric element 11, intermediate electrodes 12, 12, 12 formed in the ceramic dielectric element 11, electrodes 13, 14 formed on the surface of the ceramic dielectric element 11, ceramic dielectric plates 15, 16 incorporated with the ceramic dielectric element 11 and sintered together therewith, through holes 20, 20 for leading the electrodes out, leads 21, 22 connected to the electrodes 13, 14 through the throughholes 20, 20, and an external coating 23 composed of high-insulation synthetic resin such as epoxy resin for coating the whole unit. Intermediate electrodes 12, 12, 12, the electrodes 13, 14 and the ceramic dielectric plates 15, 16 have the same diameter as that of the ceramic dielectric element 11.

Figure 3A:
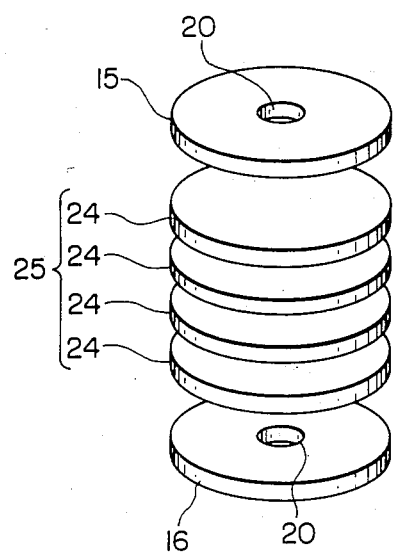
Figure 3B:
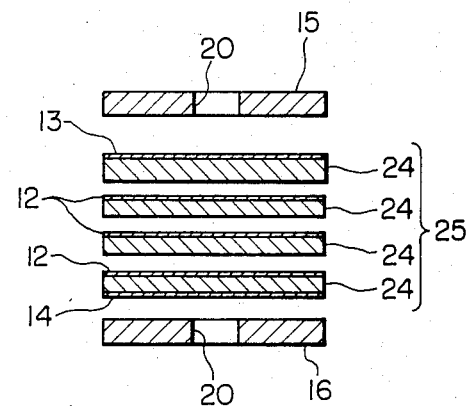
Figure 3C:
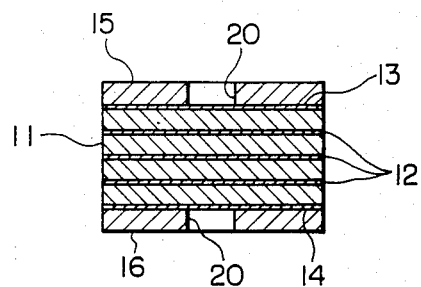

Referring to FIG. 3(a)~(c), the procedure for producing the high-voltage ceramic capacitor will be described.

The desired number of dielectric ceramic green sheets is prepared first. The dielectric ceramic green sheet 24 is prepared by adding a binder, a solvent and a dispersant to dielectric ceramic powder, thoroughly blending them to make slurry, vacuum-defoaming the product and then finishing it through the doctor-blade method. Since the dielectric ceramic green sheet is obtained in such a state that the foam has been removed from the slurry through the vacuum-defoaming operation, it is free from pinholes and not only uniform but also fine in quality.

Subsequently, conductive paste corresponding to the intermediate electrodes 12, 12, 12 is printed on and applied to the dielectric ceramic green sheet 24 punched in a desired form and these sheets 24 are stacked up to form a laminated body 25.

Conductive paste corresponding to the electrodes 13, 14 is further printed on and applied to both surfaces of the laminated body 25.

As the conductive paste constituting the intermediate electrodes 12, 12, 12 and the electrodes 13, 14, there are platinum, palladium and silver-palladium, for instance, offering high conductivity and a high melting point. As is obvious from the drawings, each of the electrodes 12, 13, 14 has the same external diameter as that of the laminated body 25.

Then the dielectric ceramic green sheets 15, 16 are stacked on both surfaces of the laminated body 25. The dielectric ceramic green sheets 15, 16 have the same external diameters of the dielectric ceramic green sheets 24 constituting the laminated body 25. For the dielectric ceramic green sheets 15, 16, the dielectric ceramic green sheet 24 may be utilized or they may be formed through the same procedure as what is employed for the dielectric ceramic green sheet 24 with suitable thickness or further the desired number of piled sheets may be used.

The stacked up sheets are joined together under pressure and, before the sheets are fired, the outer peripheries are cut in the direction of lamination to expose the end faces of the intermediate electrodes 12, 12, 12 and the electrodes 13, 14.

Subsequently, the laminate is fired in an electric furnace to make a combined sintered body and the electrode paste forming the intermediate electrodes 12, 12, 12 and the electrodes 13, 14 is thus printed.

A centerless grinding machine may be used, if necessary, to grind the outer pheripheral surface of the high-voltage ceramic capacitor thus obtained. In so doing, it is possible to make the external dimensions of the ceramic dielectric element 11, the intermediate electrodes 12, 12, 12 and the electrodes 13, 14 conform to each other for certain and further improve the withstand voltage characteristics.

As shown in FIG. 2, the leads 21, 22 are then soldered to the electrodes 13, 14 through the throughholes 20, 20 and the whole body is covered with the coating 23.

Figure 4:
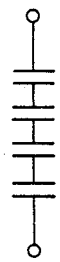
FIG. 4 is an equivalent circuit diagram of the high-voltage ceramic capacitor embodying the present invention.

FIG. 4 illustrates an equivalent circuit diagram of the high-voltage ceramic capacitor obtained.

The following Table shows experimental data on the high-voltage ceramic capacitor prepared in conformity with the method above according to the present invention and the high-voltage ceramic capacitor prepared by the conventional method described by reference to FIG. 1 in terms of d.c. breakdown voltage. However, the samples used had a diameter of 20 mm and a thickness of 5 mm, whereas the data shows the average values and standard deviations of the breakdown voltage calculated in terms of the thickness of the dielectric ceramic body per 1 mm.

|  | Present invention | Conventional product |
| --- | --- | --- |
| Average value | 43.8 KV/mm | 5.1 KV/mm |
| Standard deviation | 1.0 KV/mm | 0.2 KV/mm |

In addition to the embodiment above, the following method is preferred when a high-voltage ceramic capacitor is manufactured.

Figure 5:
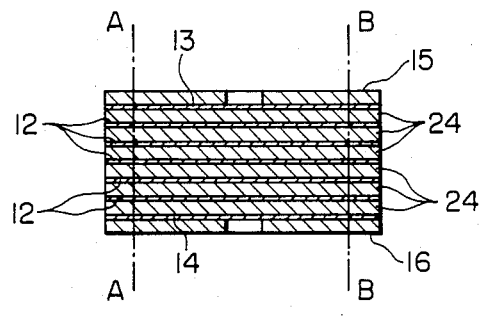
FIG. 5 is an elevational cross sectional view illustrating part of a method for producing the high-voltage ceramic capacitor according to the present invention.

Referring to FIG. 5, another method will be described.

The conductive paste 12 corresponding to the intermediate electrode is printed on and applied to the dielectric ceramic green sheet 24 and the desired number of them is stacked up to prepare a laminated body. The conductive paste 13, 14 for forming the electrodes 13, 14 shown in FIG. 2 is printed on and applied to both the surfaces of the laminated body. At this time, the external diameters of the conductive paste 13, 14 are arranged to conform to that of the laminated body. Subsequently, the dielectric ceramic green sheets 15, 16 with the conductive layers of paste 13, 14 sandwiched therebetween are stacked up and combined together under pressure to incorporate them in a body. Then the united body is cut at the positions specified by alternate long and short dash lines A—A and B—B respectively to let it have a desired shape before being fired in an electric furnace.

In this method, the external diameters of the ceramic dielectric element, the ceramic dielectric plates, intermediate electrodes and the electrodes can readily be made even, so that variations in breakdown voltage values may be minimized.

Although the laminate was cut before being fired in the above example, it may also be cut after that.

Figure 6:
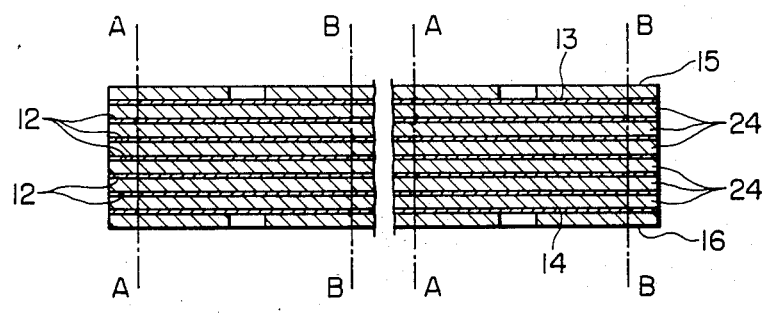
FIG. 6 is an elevational cross sectional view illustrating part of another method for producing the high-voltage ceramic capacitor according to the present invention.

FIG. 6 shows another example of manufacture wherein large dielectric ceramic green sheets 24 are prepared beforehand and conductive paste corresponding to the intermediate electrode is printed on and applied to the surface of any dielectric ceramic green sheet. These sheets are stacked up and cut at the positions specified by alternate long and short dash lines A—A and B—B in the same manner as what is shown in FIG. 4 and then fired in an electric furnace to obtain a plurality of high-voltage ceramic capacitors from one incorporated body.

As with the case of FIG. 5, products having uniform external diameters can readily be available in this method and variations in breakdown voltage values are made smaller. Further, the advantage is that a plurality of high-voltage ceramic capacitors are obtainable.

Needless to say, the laminate can be cut after being baked in this example as in the case of what is shown in FIG. 5.

In the examples of FIGS. 5 and 6, although the conductive paste was printed on and applied to each dielectric ceramic green sheet 24, it may also be so applied to any given dielectric ceramic green sheet. Moreover, a plurality of the sheets may be stacked up to increase the thickness of a dielectric ceramic green sheet 24 and obtain predetermined thickness. Although reference has been made to a disc type capacitor in the aforementioned embodiment, the present invention is also applicable to square plate type high-voltage ceramic capacitors and so on.

Figure 7:
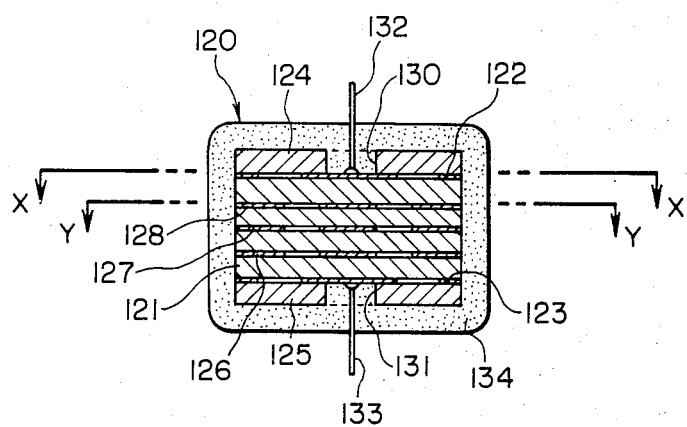
FIG. 7 is a vertical cross sectional view of another high-voltage ceramic capacitor embodying the present invention.

FIG. 7 is a vertical cross sectional view of another high-voltage ceramic capacitor 120 embodying the present invention. The high-voltage ceramic capacitor exemplified herein is so arranged that ceramics on both surfaces of an electrode can be combined in a body to increase the junction strength. The high-voltage ceramic capacitor 120 comprises a ceramic dielectric element 121 prepared by stacking up dielectric ceramic green sheets, forming them in a body and firing it, electrodes 122, 123 for taking out capacitance, ceramic dielectric plates 124, 125 as the outermost layers within the ceramic dielectric element 121 covering the electrodes 122, 123, intermediate electrodes 126, 127, 128 contained in the ceramic dielectric element 121, throughholes 130, 131 for leading out the electrodes 122, 123 formed on the ceramic dielectric plates 124, 125, leads 132, 133 soldered to the electrodes 122, 123 through the throughholes 130, 131 and an external coating 134 composed of epoxy resin for covering the whole body. The electrodes 122, 123 for taking out the capacitance and the intermediate electrodes 126, 127, 128 have the same external diameter as that of the ceramic dielectric element 121 as in the case of the first embodiment.

Figure 8:
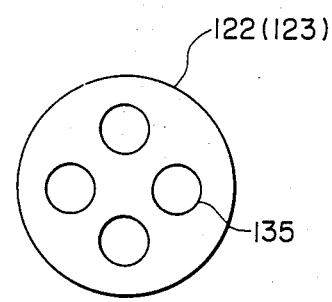
FIG. 8 is a plan view of an electrode for taking out the capacitance taken along X—X line of FIG. 7.

As shown in FIG. 8, the shape of the electrodes 122, 123 for taking out the capacitance is such that a plurality of throughholes 135 are provided in proper portions excluding their pheripheral portions.

Figure 9:
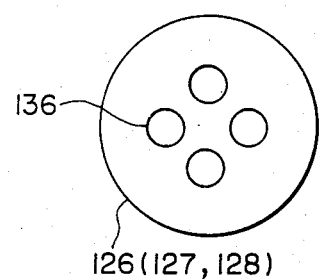
FIG. 9 is a plan view of an intermediate electrode taken along Y—Y line of FIG. 7.

Like the electrodes 122, 123, the intermediate electrodes 126, 127, 128 are, as shown in FIG. 9, provided with a plurality of throughholes 136 in proper portions excluding their peripheral portions. In this case, the throughholes 135 of the electrodes 122, 123 and those of the intermediate electrodes 126, 127, 128 may or may not be overlapped.

In the aforementioned embodiment, there are shown examples of the electrodes 122, 123 for taking out the capacitance and the intermediate electrodes 126, 127, 128 with the throughholes 135, 136 formed in all of them but it is also acceptable to provide throughholes in either the electrodes 122, 123 for taking out the capacitance of the intermediate electrodes. The throughholes may also be made in one of the electrodes 122, 123 for taking out the capacitance or otherwise at least one of the intermediate electrodes 126, 127, 128.

As set forth above, the present invention is intended to provide a high-voltage ceramic capacitor prepared by stacking up the desired number of dielectric ceramic green sheets through intermediate electrodes having the same diameter as that of the former, attaching electrodes having also the same diameter to both surfaces of the laminate, further stacking dielectric ceramic green sheets having the same diameter and throughholes for leading out the electrodes thereon and firing the combination in one body. The dielectric ceramic green sheets contain less pinholes and, in case pinholes should exist, there is little probability that the pinholes in each layer are overlapped in the direction between the electrodes. Accordingly, the quality of the ceramic dielectric element is kept constant, and a ceramic capacitor improved in withstand voltage can be obtained. Moreover, because the external electrodes and the electrodes have the same external diameter as that of the ceramic dielectric element and the upper face of the electrode is coated with a ceramic dielectric plate having the same diameter, the concentration of electric charges at the edges of the electrode is eased, and the withstand voltage characteristics can largely be improved, According to the present invention, a ceramic capacitor of given thickness can be obtained by selecting the number of dielectric ceramic green sheets and those having desired withstand voltage characteristics are readily manufactured.

The method of manufacturing ceramic capacitors according to the present invention provides suitable means for making uniform the external diameters of a ceramic dielectric element, ceramic dielectric plates, intermediate electrodes and electrodes and further making available a plurality of high-voltage ceramio capacitors through the process.

The method of manufacturing the high-voltage ceramic capacitor as another embodiment of the present invention includes the steps of providing throughholes in proper places of the electrodes and putting together the ceramic dielectric elements on both surfaces of the electrodes and, since ceramics as common substrates are joined, the strength of the junction is improved and they will be prevented from being separated even if the electrode is sandwiched therebetween. Although throughholes are formed in the electrode, the throughhole of desired size provided without cutting open the periphery of the electrodes will make it possible to construct a capacitor without impairing its functions.

What is claimed is:

1. A high voltage ceramic capacitor, comprising:
   (a) at least one intermediate electrode;
   (b) a ceramic dielectric element including said intermediate electrode therein, a diameter of said intermediate electrode being equal to that of said ceramic dielectric element;
   (c) outer electrodes formed on two opposite surfaces of said ceramic dielectric element, an outer diameter of each of said outer electrodes being equal to that of said ceramic dielectric element;
   said ceramic dielectric element comprising a plurality of layers, each two of said electrodes being separated by one such layer, and each such layer comprising a plurality of dielectric ceramic green sheets; and
   (d) ceramic dielectric plates having the same outer diameter as that of said ceramic dielectric element, said plates having throughholes in the center thereof for accommodating leads to said outer electrodes, said ceramic dielectric plates being formed on said two opposite surfaces of said ceramic dielectric element and on said outer electrodes;
   said ceramic dielectric plates and said electrodes comprising material that is cofired with material of said ceramic dielectric element and thereby sintered to form one body together with said ceramic dielectric element.

2. A high-voltage ceramic capacitor as claimed in claim 1, wherein said ceramic dielectric element is prepared by stacking up a desired number of dielectric ceramic green sheets to form a laminate in such a manner that said intermediate electrodes having the same diameter as that of said ceramic dielectric element are formed on corresponding ones of said desired number of dielectric ceramic green sheets.

3. A high-voltage ceramic capacitor as claimed in claim 2, wherein said ceramic dielectric plates are prepared from dielectric ceramic green sheets stacked up on both surfaces of said laminate through said electrodes, the whole body thus prepared being joined together under pressure and fired.

4. A high-voltage ceramic capacitor as in claim 1, wherein said ceramic dielectric element comprises ceramic dielectric material that is substantially uniform and free of pinholes.

5. A high-voltage ceramic capacitor as in claim 4, wherein said last-mentioned ceramic dielectric material is formed from a slurry including a dielectric ceramic powder, which slurry has been vacuum defoamed.

6. A high-voltage ceramic capacitor as in claim 1, further comprising respective leads integrally attached to said outer electrodes and accommodated in said throughholes.

7. A high-voltage ceramic capacitor as in claim 6, wherein said leads are integrally attached to said outer electrodes by solder material fused to said leads and said outer electrodes.

8. A high voltage ceramic capacitor comprising:
(a) at least one intermediate electrode;
(b) a ceramic dielectric element including said intermediate electrode therein, a diameter of said intermediate electrode being equal to that of said ceramic dielectric element;
(c) outer electrodes formed on two opposite surfaces of said ceramic dielectric element, an outer diameter of each of said outer electrodes being equal to that of said ceramic dielectric element;
said ceramic dielectric element comprising a plurality of layers, each two of said electrodes being separated by one such layer, and each such layer comprising a plurality of dielectric ceramic green sheets; and
(d) ceramic dielectric plates having the same outer diameter as that of said ceramic dielectric element, said plates having throughholes in the center thereof for accommodating leads to said outer electrodes, said ceramic dielectric plates being formed on said two opposite surfaces of said ceramic dielectric element and on said outer electrodes;
said ceramic dielectric plates and said electrodes comprising material that is cofired with material of said cermic dielectric element and thereby sintered to form one body together with said ceramic dielectric element; and
at least one of said outer electrodes and said intermediate electrodes being provided with throughholes in portions thereof, excluding the peripheral portions thereof, and ceramic dielectric material of said ceramic dielectric element on opposite sides of said lastmentioned electrode being conjoined through said throughholes.

9. A method for producing a high-voltage ceramic capacitor comprising the steps of
preparing a desired number of dielectric ceramic green sheets and stacking respective pluralities of said sheets to form a plurality of dielectric ceramic layers,
forming intermediate electrodes on at least one surface of at least one of said dielectric ceramic layers,
stacking up said dielectric ceramic layers to provide a laminate,
stacking dielectric ceramic green sheets on both surfaces of said laminate through outer electrodes,
incorporating the combination in a body, and
cutting the united body in the direction of the thickness thereof before or after firing said body to let said laminate, intermediate electrodes and electrodes have the same external diameter.

10. A method for producing a high-voltage ceramic capacitor as claimed in claim 9, said method comprising the steps of preparing large dielectric ceramic green sheets, forming intermediate electrodes on the surfaces of the desired dielectric ceramic green sheets, stacking up said dielectric ceramic green sheets to provide a laminate, stacking dielectric ceramic green sheets on both surfaces of said laminate through electrodes, incorporating the combination in a body, cutting the united body in the direction of the thickness thereof before or after firing said body, and obtaining a plurality of high-voltage ceramic capacitors wherein said laminate, intermediate electrodes and electrodes have the same external diameter.

11. A method for producing a high-voltage ceramic capacitor as in claim 9, wherein said step of preparing ceramic green sheets includes preparing dielectric ceramic green sheets that are substantially uniform and free from pinholes for increasing their breakdown voltage.

12. A method as in claim 11, wherein said step of preparing ceramic green sheets further includes preparing a slurry including a dielectric ceramic powder and then vacuum defoaming the slurry.

13. A method for producing a high-voltage ceramic capacitor as claimed in claim 9, further comprising the steps of
forming, in at least one of said electrodes, at least one throughhole in a portion thereof, excluding the peripheral portions, and
joining, through said throughhole, ceramic dielectric material of said dielectric ceramic layers on opposite sides of said electrode.

* * * * *